(12) United States Patent
Kim

(10) Patent No.: US 8,276,562 B2
(45) Date of Patent: Oct. 2, 2012

(54) BALANCE SHAFT MOUNTING SYSTEM

(75) Inventor: Sung Kwang Kim, Seoul (KR)

(73) Assignees: Hyundai Motor Company, Seoul (KR); Kia Motor Corporation, Seoul (KR)

( * ) Notice: Subject to any disclaimer, the term of this patent is extended or adjusted under 35 U.S.C. 154(b) by 527 days.

(21) Appl. No.: 12/533,584

(22) Filed: Jul. 31, 2009

(65) Prior Publication Data

US 2010/0132653 A1    Jun. 3, 2010

(30) Foreign Application Priority Data

Dec. 1, 2008   (KR) ........................ 10-2008-0120638

(51) Int. Cl.
  *F02B 75/06* (2006.01)
(52) U.S. Cl. .................. 123/192.2; 123/192.1
(58) Field of Classification Search .............. 123/192.1, 123/192.2; 29/888.08
  See application file for complete search history.

(56) References Cited

U.S. PATENT DOCUMENTS

| | | | |
|---|---|---|---|
| 5,000,140 A * | 3/1991 | Bates et al. | 123/192.2 |
| 6,098,273 A * | 8/2000 | Fernandez | 29/732 |
| 6,708,663 B1 * | 3/2004 | Stuckler | 123/192.2 |
| 6,868,816 B2 * | 3/2005 | Hiraki et al. | 123/192.2 |
| 7,370,624 B2 * | 5/2008 | Messing et al. | 123/192.2 |
| 7,703,429 B2 * | 4/2010 | Marzy et al. | 123/192.2 |
| 7,748,292 B2 * | 7/2010 | Takeuchi | 74/595 |
| 7,921,825 B2 * | 4/2011 | Gauthier | 123/192.2 |
| 2003/0106518 A1 * | 6/2003 | Purcell et al. | 123/192.2 |

FOREIGN PATENT DOCUMENTS

JP    2007-239521 A    9/2007

* cited by examiner

*Primary Examiner* — Nathan Wiehe
*Assistant Examiner* — Grant Moubry
(74) *Attorney, Agent, or Firm* — Morgan, Lewis & Bockius LLP

(57) ABSTRACT

A balance shaft includes a housing that is disposed under an engine and a first hole is formed thereto, a balance shaft that is disposed to the housing and a second hole is formed thereto and a mounting pin that is inserted into the first hole through the second hole for mounting the balance shaft.

12 Claims, 4 Drawing Sheets

(a)   (b)

BALANCE SHAFT MOUNTING SYSTEM

CROSS-REFERENCE TO RELATED APPLICATION

The present application claims priority to Korean Patent Application Number 10-2008-0120638 filed on Dec. 1, 2008, the entire contents of which application is incorporated herein for all purposes by this reference.

BACKGROUND OF THE INVENTION

1. Field of the Invention

The present invention relates to a balance shaft mounting system. More particularly, the present invention relates to a balance shaft mounting system that may easily mount a balance shaft and improve producing and maintaining efficiency.

2. Description of Related Art

Balance shafts are most common in engines which, due to the asymmetry of their design, have an inherent second order vibration (vibrating at twice the engine RPM) which cannot be eliminated no matter how well the internal components are balanced.

Generally one or two balance shaft is used according to arrangement or a number of cylinders of an engine and the balance shaft rotate at the same or twice rotation speed of a crankshaft.

BSM (Balance Shaft and oil pump Module) includes the balance shaft and is connected to an engine.

FIG. 4 is drawing showing a conventional BSM including a balance shaft connected to an engine.

As shown in FIG. 4, when assembling a BSM 140 to an engine 150, a crankshaft timing mark 154 and a BSM gear timing mark 144 are used for arranging a crankshaft gear 152 and the BSM 140.

That is, after arranging the crankshaft timing mark 154 and the BSM gear timing mark 144, a timing pin 130 is separated from a pin hole 146 of the BSM gear 142.

An interior diameter of the pin hole 146 has to be big enough to separate the timing pin 130.

However, when mounting the BSM, the crankshaft timing mark 154 and the BSM gear timing mark 144 have to be marked to the crankshaft gear 152 and the BSM gear 142 respectively, and if gear ratio is not 1:1, checking the arrangement is difficult so that maintaining can be poor.

In addition, if a transmission is disposed to the BSM gear 142 direction, the transmission has to be disassembled for replacement or maintenance of the BSM.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a balance shaft mounting system that may easily mounting a balance shaft and improve producing and maintaining efficiency.

In an aspect of the present invention, the balance shaft mounting system may include a housing that is disposed under an engine and a first hole is formed thereto, a balance shaft that is disposed to the housing and a second hole is formed thereto, and a mounting pin that is inserted into the first hole through the second hole for mounting the balance shaft.

A slot may be formed to the mounting pin along a length direction of the mounting pin for maintaining a gap during insertion thereof, wherein the mounting pin includes, a first portion that is disposed to the first hole, and a second portion that is disposed to the second hole, wherein a diameter of the first portion is larger than a diameter of the second portion.

The slot may be formed in the second portion of the mounting pin.

At least a groove may be formed to the second portion along a circumferential direction of the second portion for smoothly separating the mounting pin from the balance shaft.

A protrusion may be formed to a head of the mounting pin for separating the mounting pin, wherein the slot and the protrusion are formed to the same direction.

The balance shaft may be positioned to a corresponding position of a top dead center position when the mounting pin is connected to the housing and the balance shaft.

In another aspect of the present invention, the balance shaft mounting system may include a BSM (Balance Shaft and oil pump Module) including a housing that is disposed under an engine and a first hole is formed thereto, and a balance shaft that is disposed to the housing and a second hole is formed thereto, and a mounting pin that is inserted into the first hole through the second hole for mounting the balance shaft.

In various aspects of the present invention, the balance shaft mounting system may reduce manufacturing cost and maintenance can be easily realized.

In addition, a BSM (Balance Shaft and oil pump Module) can be easily maintained irrespective of positions of a transmission.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
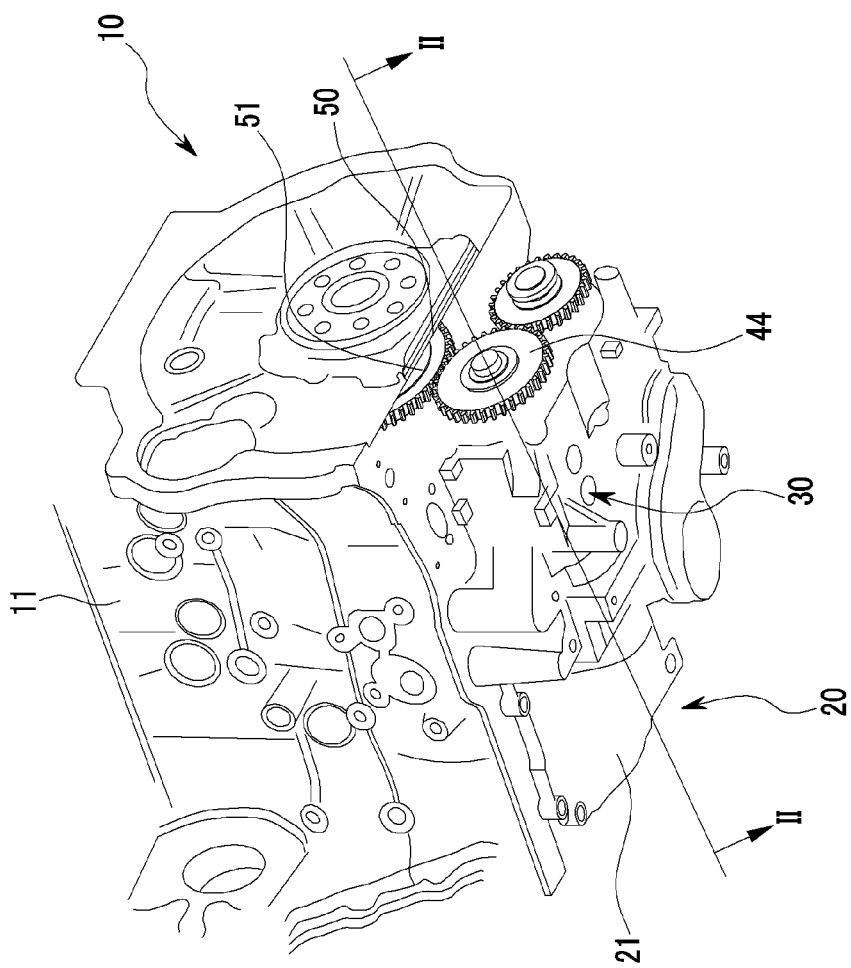
FIG. 1 is a perspective view showing connection of an exemplary balance shaft mounting system and an engine according to the present invention.
Figure 2:
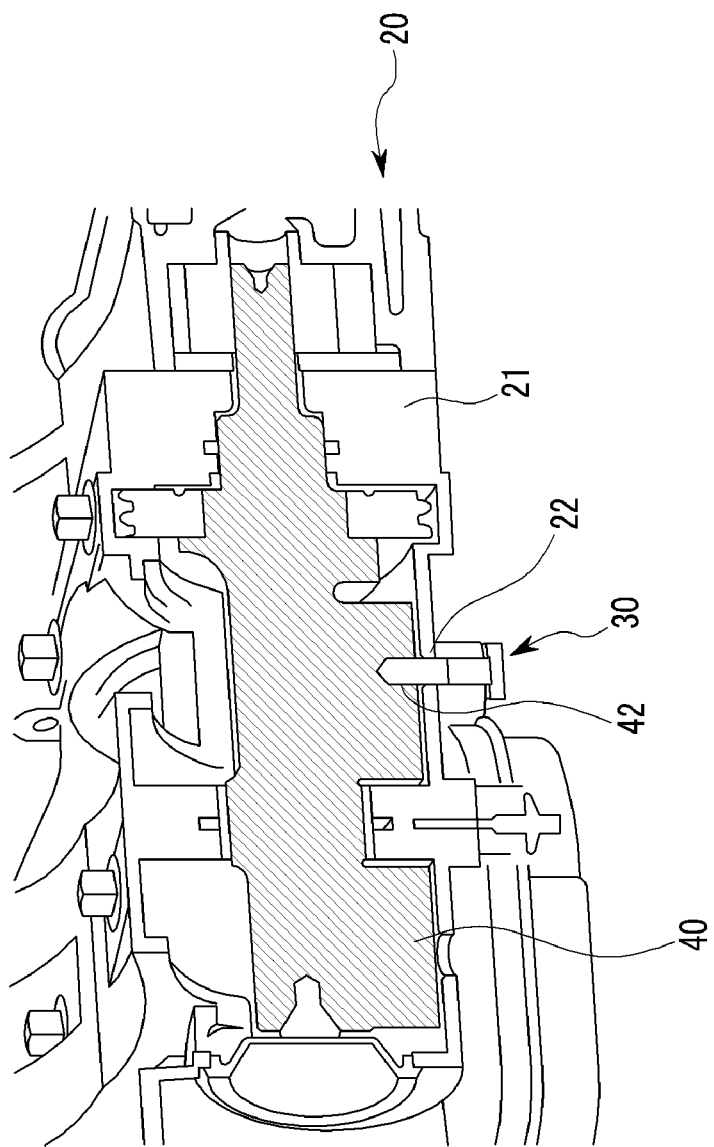
FIG. 2 is a cross-sectional view along line II-II of FIG. 1.
Figure 3:
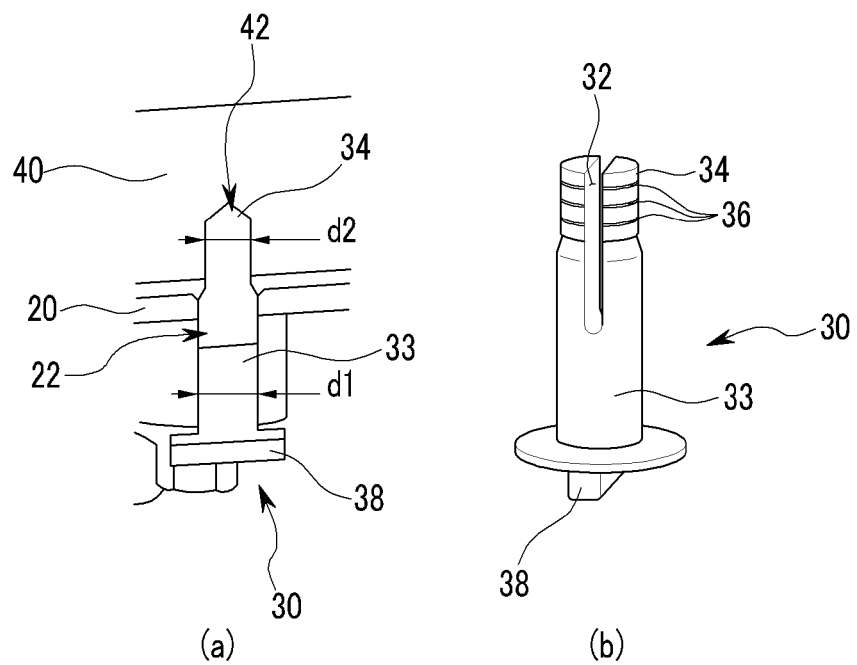
FIG. 3 is a drawing showing an exemplary mounting pin of a balance shaft mounting system according to the present invention.
Figure 4:
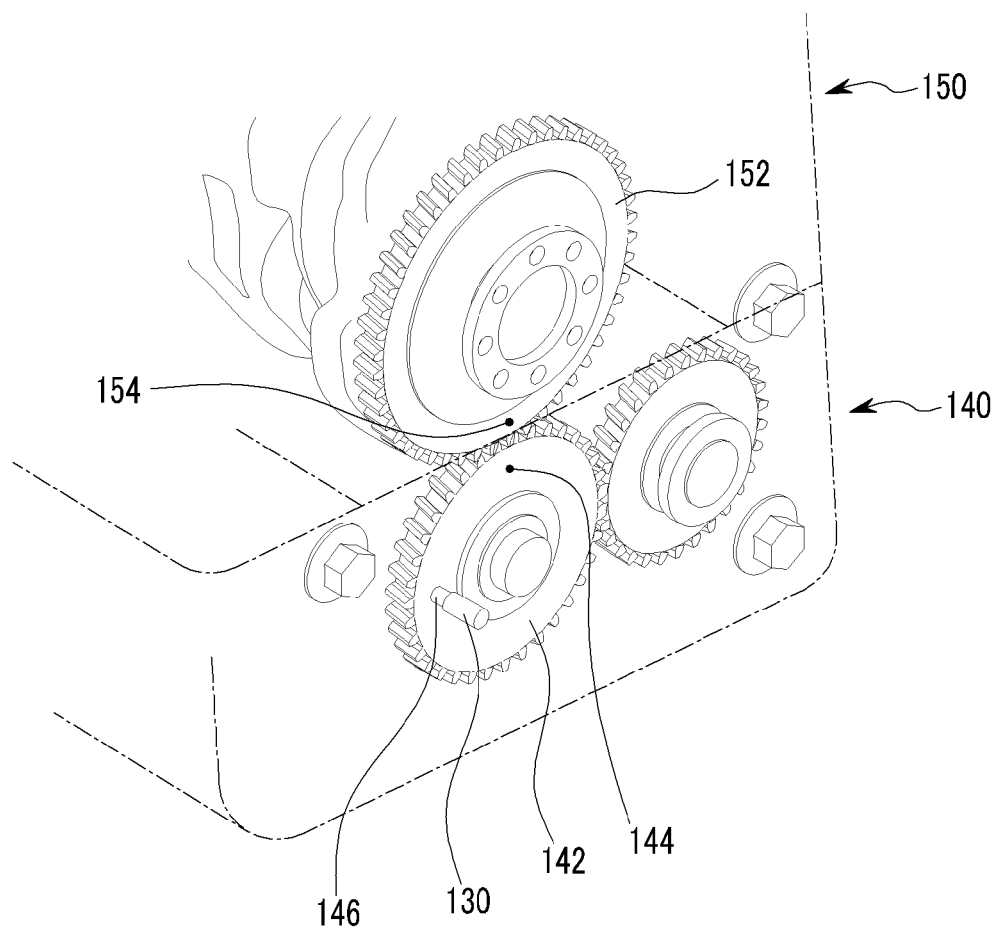
FIG. 4 is drawing showing a conventional BSM including a balance shaft connected to an engine.

FIG. 1 is a perspective view showing connection of a balance shaft mounting system and an engine, FIG. 2 is a cross-sectional view along line II-II of FIG. 1, and FIG. 3 is a drawing showing a mounting pin of a balance shaft mounting system according to various embodiments of the present invention.

Referring to FIG. 1 to FIG. 3, a balance shaft mounting system according to various embodiments of the present invention includes an engine 10 and a BSM (Balance Shaft and oil pump Module; 20) mounted to the engine 10.

The engine 10 includes an engine block 11, a crankshaft 51 that is rotatably installed on a lower portion of the engine block 11, and a balancer housing 21. The BSM 20 includes the housing 21 that is disposed under the crankshaft 51 and a first hole 22 is formed thereto, and a balance shaft 40 that is disposed to the housing 21 and a second hole 42 is formed thereto.

A mounting pin 30 is inserted into the first hole 22 through the second hole 42 for mounting the balance shaft 40.

A slot 32 is formed to the mounting pin 30 along length direction of the mounting pin 30 for maintaining a gap during insertion.

The mounting pin 30 includes a first portion 33 that is disposed to the first hole 22 and a second portion 34 that is disposed to the second hole 42, and a diameter of the first portion d1 is larger than that of the second portion d2.

A groove 36 is formed to the second portion 34 along a circumferential direction of the second portion 34 for smoothly separating the mounting pin 30.

A protrusion 38 is formed to a head of the mounting pin 30 for separating the mounting pin 30.

The slot 32 and the protrusion 38 are formed to the same direction.

The balance shaft 40 is positioned to a corresponding position of a top dead center position when the mounting pin 30 is connected to the housing 21 and the balance shaft 40.

For arranging the crankshaft gear 50 and the balance shaft gear 44, a gap has to be formed to rotate the balance shaft 40 in a predetermined angle. However, the slot 32 permits the balance shaft 40 to be rotate in a predetermined angle.

With forming the slot 32, the second hole 42 do not need to be precisely manufactured so that production cost can be reduced.

The diameter of the first portion d1 is larger than the diameter of the second portion d2 so that the second hole 42 can be easily separated. And the groove 36 permits the second portion 34 to be crushed for separating the mounting pin 30.

The slot 32 and the protrusion 38 are formed to the same direction so that arrangement of the slot 32 along rotation direction of the balance shaft 40 can be easily realized.

After arrangement of the crankshaft gear 50 to a position corresponded to a top dead center of a predetermined cylinder and the balance shaft 40 to a position corresponded to a top dead center, the BSM 20 can be easily mounted.

The balance shaft mounting system according to various embodiments of the present invention may realize with the balance shaft 40 disposed to the housing 21 without the BSM 20.

For convenience in explanation and accurate definition in the appended claims, the terms "upper" and "lower" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A balance shaft mounting system comprising:
   a balancer housing disposed under a crankshaft of an engine that includes an engine block and a crankshaft that is rotatably installed on a lower portion of the engine block, wherein the balancer housing has a first hole formed therein;
   a balance shaft that is disposed on the balancer housing and a second hole is formed therein; and
   a mounting pin that is inserted into the first hole through the second hole for mounting the balance shaft,
   wherein a slot is formed in the mounting pin along a length direction of the mounting pin for maintaining a gap during insertion thereof.

2. The balance shaft mounting system of claim 1, wherein the mounting pin comprises:
   a first portion that is disposed in the first hole; and
   a second portion that is disposed in the second hole,
   wherein a diameter of the first portion is larger than a diameter of the second portion.

3. The balance shaft mounting system of claim 2, wherein the slot is formed in the second portion of the mounting pin.

4. The balance shaft mounting system of claim 1, wherein at least a groove is formed to the second portion along a circumferential direction of the second portion for smoothly separating the mounting pin from the balance shaft.

5. The balance shaft mounting system of claim 1, wherein a protrusion is formed on a head of the mounting pin for separating the mounting pin.

6. The balance shaft mounting system of claim 5, wherein the slot and the protrusion are formed in the same direction.

7. The balance shaft mounting system of claim 1, wherein the balance shaft is positioned to a corresponding position of a top dead center position when the mounting pin is connected to the housing and the balance shaft.

8. A balance shaft mounting system comprising:
   a balance shaft and oil pump module (BSM) including a balancer housing disposed under a crankshaft of an engine that includes an engine block and a crankshaft that is rotatably installed on a lower portion of the engine block,
   wherein the balancer housing includes a first hole formed in balancer the housing and a balance shaft that is disposed within the housing, and
   wherein a second hole is formed in the balance shaft; and
   a mounting pin that is inserted into the first hole through the second hole for mounting the balance shaft,
   wherein a slot is formed to the mounting pin along a length direction of the mounting pin for maintaining a gap during insertion thereof.

9. The balance shaft mounting system of claim 8, wherein the mounting pin comprises a first portion that is disposed in the first hole and a second portion that is disposed in the second hole,
   wherein a diameter of the first portion is larger than a diameter of the second portion.

10. The balance shaft mounting system of claim 8, wherein at least a groove is formed to the second portion along a circumferential direction of the second portion for smoothly separating the mounting pin.

11. The balance shaft mounting system of claim 8, wherein a protrusion is formed on a head of the mounting pin for separating the mounting pin.

12. The balance shaft mounting system of claim 11, wherein the slot and the protrusion are formed in the same direction.

* * * * *